US012306711B2

(12) United States Patent
Hampel et al.

(10) Patent No.: US 12,306,711 B2
(45) Date of Patent: May 20, 2025

(54) DYNAMICALLY CONFIGURABLE MEMORY ERROR CONTROL SCHEMES

(71) Applicant: Rambus Inc., San Jose, CA (US)

(72) Inventors: Craig E. Hampel, Los Altos, CA (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 31 days.

(21) Appl. No.: 18/036,246

(22) PCT Filed: Nov. 16, 2021

(86) PCT No.: PCT/US2021/059492
§ 371 (c)(1),
(2) Date: May 10, 2023

(87) PCT Pub. No.: WO2022/119704
PCT Pub. Date: Jun. 9, 2022

(65) Prior Publication Data
US 2024/0012709 A1 Jan. 11, 2024

Related U.S. Application Data

(60) Provisional application No. 63/121,131, filed on Dec. 3, 2020.

(51) Int. Cl.
*G06F 11/10* (2006.01)
(52) U.S. Cl.
CPC .......... *G06F 11/1008* (2013.01); *G06F 11/10* (2013.01); *G06F 11/1044* (2013.01)

(58) Field of Classification Search
CPC .. G06F 11/10; G06F 11/1048; G06F 11/1008; G06F 11/1044
See application file for complete search history.

(56) References Cited

U.S. PATENT DOCUMENTS 5,392,244 A * 2/1995 Jacobson ............ G06F 11/2087
711/170
5,758,050 A * 5/1998 Brady .................... G06F 3/0631
714/1

(Continued)

OTHER PUBLICATIONS

L. Yuan, H. Liu, P. Jia and Y. Yang, "Reliability-Based ECC System for Adaptive Protection of NAND Flash Memories," 2015 Fifth International Conference on Communication Systems and Network Technologies, Gwalior, India, 2015.*

(Continued)

*Primary Examiner* — Steve N Nguyen
(74) *Attorney, Agent, or Firm* — The Neudeck Law Firm, LLC

(57) ABSTRACT

A multi-host processing system may access memory devices (e.g., memory modules, memory integrated circuits, etc.) via memory nodes having memory controllers. The memory controllers may be configured to use more than one error control scheme when accessing the same memory devices. The selection of the error control scheme may be made based on the interface receiving the memory transaction request. The selection of the error control scheme may be made based on information in the memory transaction request. The selection of the error control scheme may be made based on the fabric physical address and a lookup table or address range registers. The selection of the error control scheme may be made based on the memory device physical address and a lookup table or address range registers.

20 Claims, 10 Drawing Sheets

(56) References Cited

U.S. PATENT DOCUMENTS

| | | | |
|---|---|---|---|
| 5,905,858 A | 5/1999 | Jeddeloh | |
| 7,533,330 B2* | 5/2009 | Anderson | G11B 20/1833 |
| | | | 714/763 |
| 8,341,503 B1* | 12/2012 | Yoon | G06F 11/1048 |
| | | | 711/173 |
| 8,869,009 B2* | 10/2014 | Gurgi | G06F 11/10 |
| | | | 714/773 |
| 9,934,086 B2 | 4/2018 | Laity et al. | |
| 10,031,801 B2* | 7/2018 | Govindan | G06F 3/0619 |
| 10,198,310 B1* | 2/2019 | Zhu | G06F 11/1008 |
| 11,200,114 B2* | 12/2021 | Chen | G06F 11/1032 |
| 2005/0256976 A1 | 11/2005 | Susairaj et al. | |
| 2008/0082731 A1* | 4/2008 | Karamcheti | G11C 7/1072 |
| | | | 711/E12.008 |
| 2009/0327647 A1 | 12/2009 | Ingle et al. | |
| 2014/0047306 A1 | 2/2014 | Perego | |
| 2019/0073261 A1* | 3/2019 | Halbert | G06F 3/0679 |

OTHER PUBLICATIONS

Notification of Transmittal of the International Search Report and the Written Opinion of the International Searching Authority, or the Declaration with Mail Date Jun. 1, 2022 re: Int'l Appln, No. PCT/US2021/059492. 18 pages.

* cited by examiner

DYNAMICALLY CONFIGURABLE MEMORY ERROR CONTROL SCHEMES

DETAILED DESCRIPTION OF THE EMBODIMENTS

A multi-host processing system may access memory devices (e.g., memory modules, memory integrated circuits, etc.) via memory nodes having memory controllers. In an embodiment, the memory controllers may be configured to use more than one error control scheme (a.k.a., memory error resiliency policy) when accessing the same memory devices. For example, a memory controller may access one region of memory that is protected using a (39,32) Hamming code to provide single error correct double error detect protection/resiliency policy from one memory region and also access another region of the same memory device(s) using a more sophisticated non-binary block code (e.g., Reed-Solomon, BCH, etc.) that provides single symbol correct double symbol detect for 4-bit symbols.

In an embodiment, the selection of the error control scheme may be made based on the interface receiving the memory transaction request. In an embodiment, the selection of the error control scheme may be made based on information in the memory transaction request. In an embodiment, the selection of the error control scheme may be made based on the specific node interface that the transaction was received on. In an embodiment, the selection of the error control scheme may be made based on the fabric physical address and a lookup table or address range registers. In an embodiment, the selection of the error control scheme may be made based on the memory physical address and a lookup table or address range registers.

Figure 1:
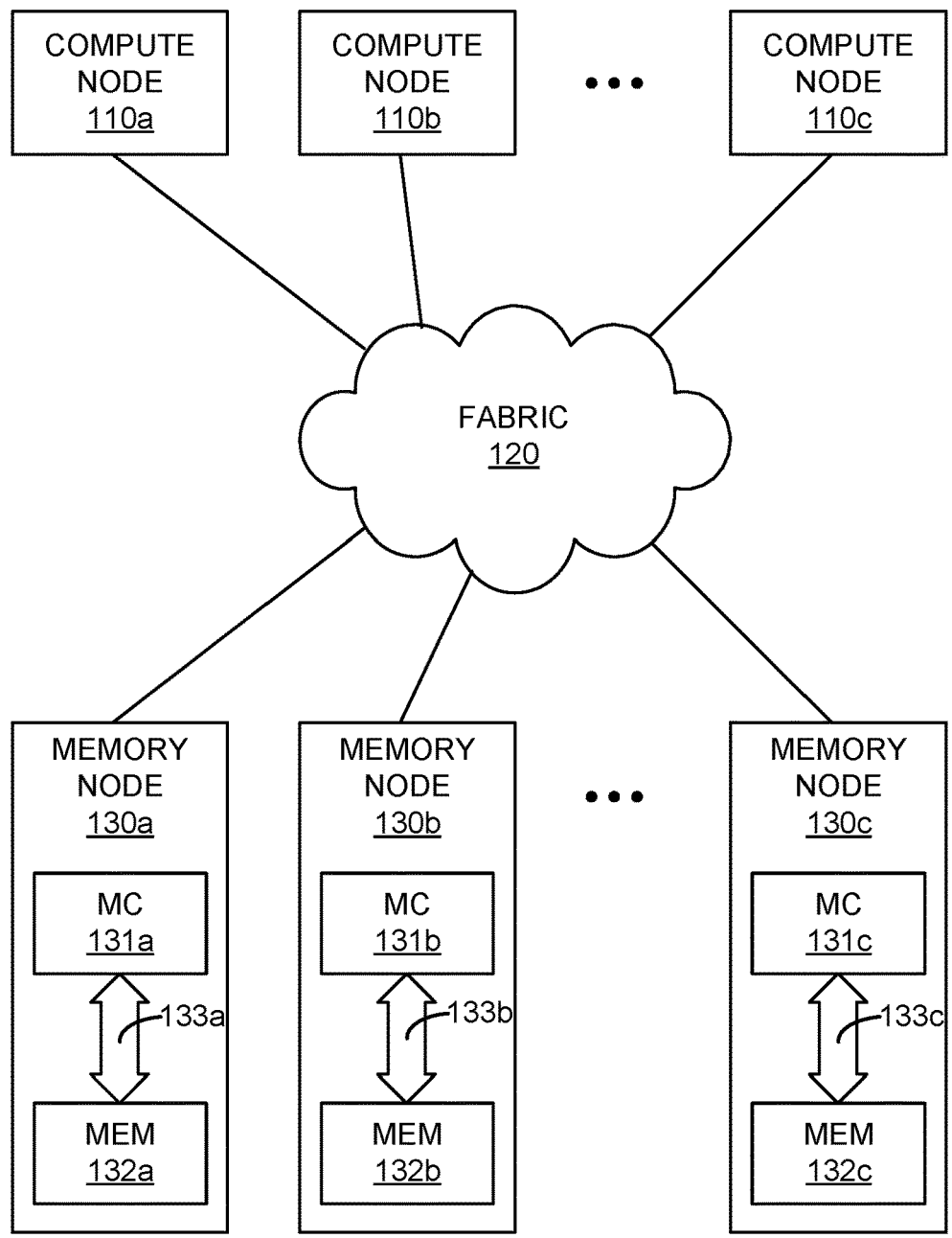
FIG. 1 is a block diagram illustrating a fabric interconnected processing system.

FIG. 1 is a block diagram illustrating a fabric interconnected processing system. In FIG. 1, processing system 100 comprises compute nodes 110a-110c, fabric 120, and memory nodes 130a-130c. Memory nodes 130a-130c include memory controllers 131a-131c, respectively. Memory nodes 130a-130c include memory devices 132a-132c, respectively. Memory controllers 131a-131c are operatively coupled to memory devices 132a-132c by memory channels 133a-133c, respectively.

Compute nodes 110a-110c are each operatively coupled to fabric 120. Memory nodes 130a-130c are each operatively coupled to fabric 120. Each of compute nodes 110a-110c and memory nodes 130a-130c is operatively coupled to fabric 120 to communicate and/or exchange information, data, etc. with one or more other compute nodes 110a-110c and/or memory nodes 130a-130c.

Fabric 120 may be or comprise a switched fabric, point-to-point connections, and/or other interconnect architectures (e.g., ring topologies, crossbars, etc.) Fabric 120 may include links, linking, and/or protocols that are configured to be cache coherent. For example, fabric 120 may use links, linking, and/or protocols that include functionality described by and/or are compatible with one or more of Compute Express Link (CXL), Coherent Accelerator Processor Interface (CAPI), and Gen-Z standards, or the like. In an embodiment, compute nodes 110a-110c are operatively coupled to fabric 120 to load and/or store information from/to memory nodes 130a-130c that resides within memory devices 132a-132c.

In an embodiment, one or more memory controllers 131a-131c may be configured to use more than one error control scheme when accessing memory devices 132a-132c, respectively. For example, two or more error control policies can be implemented within a single memory node 130a-130c and in a single memory controller 131a-131c. Having memory controllers 131a-131c have an adaptable error control scheme for accesses to the same memory device 132a-132c allows applications, operating systems, and/or hypervisors executing on one or more compute nodes 110a-110c to select the error control scheme that best fits the needs of the application, operating system, and/or hypervisor. The error control scheme selected by applications, operating systems, and/or hypervisors may be based on a policy designed to improve and/or trade-off between bandwidth, latency, error recovery, and error detection. In the case of error detection, error recovery may be further provided by system level solutions including recovering an error free copy of data from another location in the system including storage if it is available.

In an embodiment, the selection of the error control scheme used by memory controllers 131a-131c when accessing respective memory devices 132a-132c may be made based on the memory node 130a-130c interface receiving the memory transaction request. For example, if each compute node 110a-110c is associated, by memory node 130a-130c (and memory controllers 131a-131c, in particular) with a particular memory node 130a-130c interface to fabric 120, the identification of the fabric interface receiving the request may be used to determine the error control scheme used by memory controllers 131a-131c when accessing respective memory devices 132a-132c. Memory nodes 130a-130c may be configured by one or more compute nodes 110a-110c with an association between fabric interfaces and error control schemes.

In an embodiment, the selection of the error control scheme used by memory controllers 131a-131c when accessing respective memory devices 132a-132c may be made based on information in the memory transaction request received from a compute node 110a-110c. For example, a compute node 110a-110c sending a memory transaction request (e.g., read or write) to a memory node 130a-130c may include an indicator (e.g., bit or bits) of the error control scheme a memory controller 131a-131c is to use when storing/retrieving data from memory devices 132a-132c. In another example, a compute node 110a-110c sending a memory transaction request (e.g., read or write) to a memory node 130a-130c may include a processor core identification that is associated by memory controller 131a-131c with an error control scheme to be used when that processor core is storing/retrieving data from memory devices 132a-132c. In another example, a compute node 110a-110c sending a memory transaction request (e.g., read or write) to a memory node 130a-130c may include a virtual machine identification that is associated by memory controller 131a-131c with an error control scheme to be used when that virtual machine is storing/retrieving data from memory devices 132a-132c.

In an embodiment, the selection of the error control scheme may be made based on the fabric physical address of the memory transaction request and a lookup table and/or address range registers. For example, one or more of compute nodes 110a-110c may configure one or more memory controllers 131a-131c with a table that associate fabric physical address ranges to error control schemes.

In an embodiment, the selection of the error control scheme may be made based on the memory physical address and a lookup table or address range registers. For example, one or more of compute nodes 110a-110c may configure one or more memory controllers 131a-131c with a table that associate memory physical address ranges used by memory channels 133a-133c to error control schemes.

In an embodiment, one or more of memory controllers 131a-131c, memory channels 133a-133c and memory devices 132a-132c are compatible with the double data rate 5 (DDR5) standard. Thus, memory controllers 131a-131c interface with memory devices 132a-132c via two independent memory channels 133a-133c, respectively. The two independent memory channels 133a-133c may have 40 bits or 32 bits of data width per independent channel. Example error control schemes for DDR5 memory channels 133a-133c are illustrated in Table 1.

TABLE 1

| Error control scheme | Symbol Size (bits) | DIMM Data width | n = total bits/symbols k = data bits/symbols (n, k) | BL16 Transaction size | strength |
|---|---|---|---|---|---|
| Hamming | 1 | 40 | (39, 32) | 64 Byte | SECDED |
| BCH code GF(16) | 4 | 40 | (10, 8) | 64 Byte | SSC |
| Hamming | 1 | 40 or 80 | (72, 64) | 128 Byte | SECDED |
| BCH code GF(16) | 4 | 40 or 80 | (20, 16) | 128 Byte | SSCDSD |

Notes:
SECDED = Single Error Correct, Double Error Detect
SSC = Single Symbol Correct
SSCDSD = Single Symbol Correct, Double Symbol Detect In an embodiment, the extra 1 bit (40 bit DIMM width minus 39 total bits) for the Hamming (39,32) coding may be used as a spare bit (i.e., to replace a dead or faulty bit) or extra parity bit to improve on the protection of the (39,32) coding alone. In an embodiment, the extra 8 bits (2×40 or 80 bit DIMM width minus 72 total bits) for the Hamming (72,64) coding may be used as eight (8) spare bits, (e.g., to replace up to eight dead or faulty bits), two spare nibbles (e.g., to replace two dead or faulty 4-bit wide devices), or one (1) spare byte (e.g., to replace a single dead or faulty 8-bit wide device) thereby improving on the protection of the (72,64) coding alone.

Figure 2:
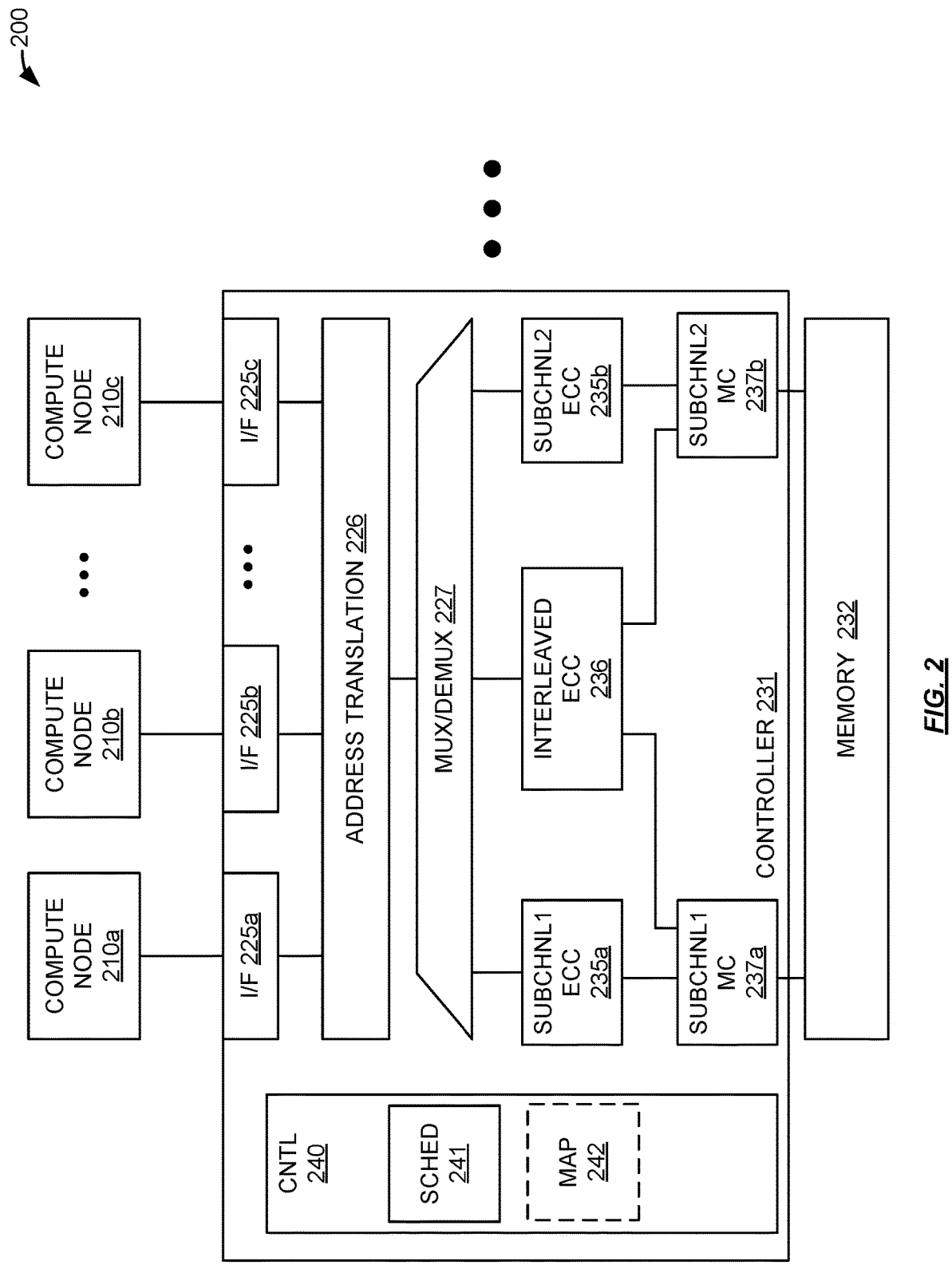
FIG. 2 is a block diagram illustrating a multi-host processing system.

FIG. 2 is a block diagram illustrating a multi-host processing system. In FIG. 2, processing system 200 comprises compute nodes 210a-210c, controller 231, and memory devices 232. Controller 231 includes interfaces 225a-225c, address translation 226, multiplexor/demultiplexor (MUX/DEMUX) 227, subchannel 1 error control 235a (a.k.a., subchannel 1 ECC), subchannel 2 error control 235b (a.k.a., subchannel 2 ECC), interleaved error control 236 (a.k.a., interleaved ECC), subchannel 1 memory controller 237a, subchannel 2 memory controller 237b, and control circuitry 240. Control circuitry 240 includes scheduler 241 and optionally error control scheme map 242.

Subchannel 1 memory controller 237a is operatively coupled to memory devices 232. Subchannel 2 memory controller 237b is operatively coupled to memory devices 232. Compute nodes 210a-210c, controller 231, subchannel memory controllers 237a-237b, and memory devices 232 may be, or comprise, integrated circuit type devices, such as are commonly referred to as a "chips". Memory controllers, such as subchannel memory controllers 237a-237b, manage the flow of data going to and from memory devices and/or memory modules. Memory devices 232 may be one or more standalone devices, or may be one or more memory modules. A memory controller can be a separate, standalone chip, or integrated into another chip. For example, a memory controller may be included on a single die with a microprocessor, or included as part of a more complex integrated circuit system such as a block of a system on a chip (SOC) (e.g., controller 231.)

Compute nodes 210a-210c are operatively coupled to interfaces 225a-225c, respectively. Interfaces 225a-225c are operatively coupled to compute nodes 210a-210c to receive memory transaction requests (e.g., read and write operations/commands directed to memory devices 232) from compute nodes 210a-210c, respectively. Interfaces 225a-225c are operatively coupled to compute nodes 210a-210c to transmit memory transaction results (e.g., data retrieved from memory devices 232) to compute nodes 210a-210c, respectively.

Figure 3A:
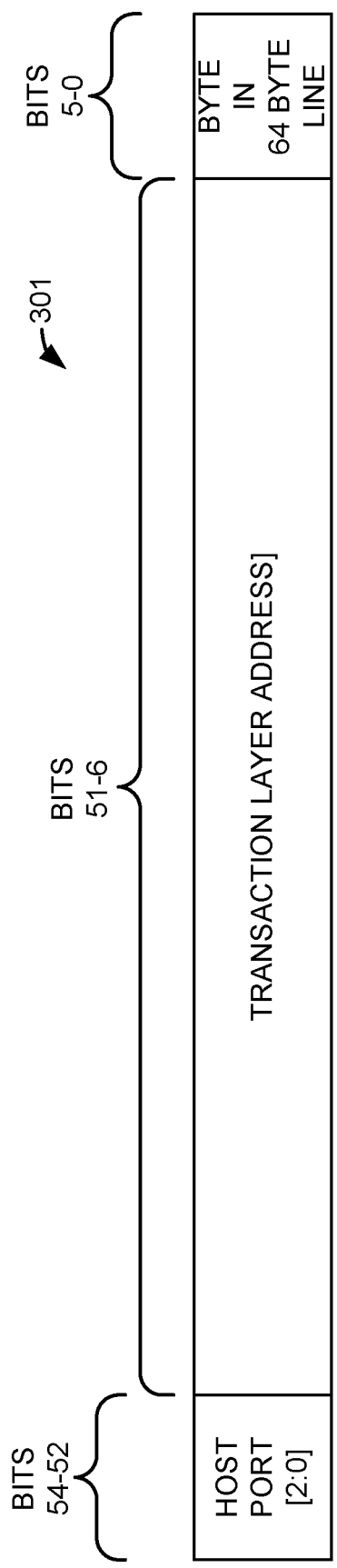
FIGS. 3A-3B are illustrations of address field assignments.

Interfaces 225a-225c are operatively coupled to address translation 226. Address translation 226 receives memory transaction requests from compute nodes 210a-210c via interfaces 225a-225c. Address translation 226 receives memory transaction requests from compute nodes 210a-210c that include address information that is given in the form of a fabric physical address (FPA). A fabric physical address specifies an address that allows for routing transactions (memory or otherwise) among compute nodes 210a-210c, memory nodes (e.g., controller 231), and/or other devices. An example of an FPA type addressing scheme is the CXL.mem transaction layer address. An example FPA field assignment is illustrated in FIG. 3A.

Figure 3B:
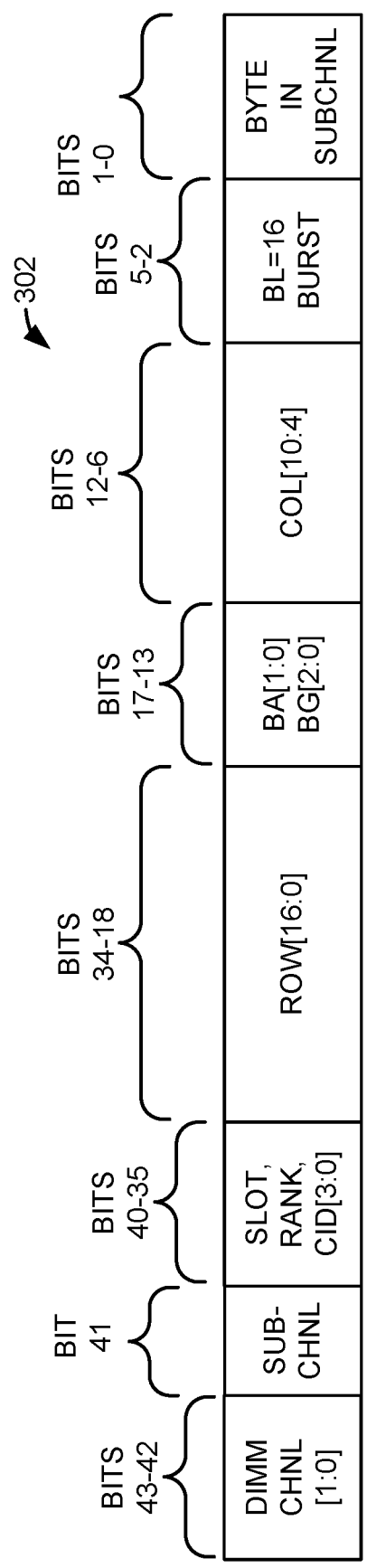

Address translation 226 translates FPAs to device channel physical addresses (DPAs). Address translation 226 translates FPAs received from compute nodes 210a-210c to device DPAs that can be used to address memory devices 232. An example DPA field assignment is illustrated in FIG. 3B.

Address translation 226 is operatively coupled to MUX/DEMUX 227. MUX/DEMUX 227 receives transaction information and DPAs from address translation 226 and extracts command, address, and data. MUX/DEMUX 227 receives memory operation information from subchannel 1 ECC 235a, subchannel 2 ECC, and/or interleaved ECC 236 and uses this information (e.g., data retrieved from memory devices 232) to create a return (result) transaction to be sent to a compute node 210a-210c.

MUX/DEMUX 227 is operatively coupled to subchannel 1 ECC 235a, subchannel 2 ECC 235b, and interleaved ECC 236. MUX/DEMUX 227 is operatively coupled to subchannel 1 ECC 235a, subchannel 2 ECC 235b, and interleaved ECC 236 to, based on the DPA and an indicator of the error control scheme to be applied to the transaction, route the command, address, and data information (if any) to the appropriate one of subchannel 1 ECC 235a, subchannel 2 ECC 235b, and interleaved ECC 236.

In an embodiment, the indicator of the error control scheme to be applied to the transaction when accessing memory devices 232 may be made based on the interface 225a-225c that received the memory transaction request. For example, if each compute node 210a-210c is associated with a particular interface 225a-225c, the identification of the interface 225a-225c receiving the request may be used to determine the error control scheme to be used when accessing memory devices 232. Based on the error control scheme to be used, and the DPA which determine which subchannel memory controller 237a-237b is to be used for non-interleaved transactions, MUX/DEMUX 227 routes the transaction information to the appropriate one of subchannel 1 ECC 235a (for non-interleaved error control scheme transactions directed to subchannel 1 by the DPA), subchannel 2 ECC 235b (for non-interleaved error control scheme transactions directed to subchannel 2 by the DPA), and interleaved ECC 236 (for interleaved error control scheme transactions). Control circuitry 240 may be configured by one or more compute nodes 210a-210c with associations between fabric interfaces 225a-225c and error control schemes. Such associations may be configured by, for example, storing the associations using an error control scheme map 242 or table.

In an embodiment, the indicator of the error control scheme to be applied to the transaction when accessing memory devices 232 may be made based on information in the memory transaction request received from a compute node 210a-210c. For example, a compute node 210a-210c sending a memory transaction request (e.g., read or write) to controller 231 may include an indicator (e.g., bit or bits) of the error control scheme controller 231 is to use when storing/retrieving data from memory devices 232. In another example, a compute node 210a-210c sending a memory transaction request (e.g., read or write) to controller 231 may include a processor core identification that is associated by controller 231 with an error control scheme to be used when that processor core is storing/retrieving data from memory devices 232. Control circuitry 240 may be configured by one or more compute nodes 210a-210c with associations between processor core identifications and error control schemes. Such associations may be configured by, for example, storing the associations using an error control scheme map 242 or table.

In another example, a compute node 210a-210c sending a memory transaction request (e.g., read or write) to controller 231 may include a virtual machine identification that is associated by controller 231 with an error control scheme to be used when that virtual machine is storing/retrieving data from memory devices 232. Control circuitry 240 may be configured by one or more compute nodes 210a-210c with associations between virtual machine identifications and error control schemes. Such associations may be configured by, for example, storing the associations using an error control scheme map 242 or table.

In an embodiment, the indicator of the error control scheme to be applied to the transaction when accessing memory devices 232 may be made based on the fabric physical address of the memory transaction request and a lookup table and/or address range registers. For example, one or more of compute nodes 210a-210c may configure controllers 231 with an error control scheme map 242 that associates fabric physical address ranges to error control schemes. Map 242 (a.k.a. a lookup table) can be modified from time to time to change the error control scheme for a given address region(s). For example, when a new application, process, and/or thread is allocated memory, the error control scheme may be updated for all or part of the memory assigned to that application, process, and/or thread. In an embodiment, map 242 may be modified/configured based on the type of data to be stored in the memory allocation. For example, map 242 may be configured such that memory allocated to hold executable code uses a very robust error control scheme while memory allocated to hold a JPEG image may, because JPEG data already includes an error control scheme, use a less robust error control scheme.

In an embodiment, the indicator of the error control scheme to be applied to the transaction when accessing memory devices 232 may be made based on the memory physical address and a lookup table or address range registers. For example, one or more of compute nodes 210a-210c may configure controller 231 with an error control scheme map 242 that associates memory physical address ranges used by subchannel memory controllers 237a-237b to identify error control schemes.

Subchannel 1 ECC 235a is operatively coupled to MUX/DEMUX 227 and subchannel 1 memory controller 237a. Subchannel 1 ECC 235a is operatively coupled to MUX/DEMUX 227 and subchannel 1 memory controller 237a to produce, check, and communicate error control information for transactions directed to subchannel 1 memory controller 237a that use non-interleaved error control schemes. Subchannel 2 ECC 235b is operatively coupled to MUX/DEMUX 227 and subchannel 1 memory controller 237b. Subchannel 2 ECC 235b is operatively coupled to MUX/DEMUX 227 and subchannel 2 memory controller 237b to produce, check, and communicate error control information for transactions directed to subchannel 2 memory controller 237b that use non-interleaved error control schemes.

Interleaved ECC 236 is operatively coupled to MUX/DEMUX 227, subchannel 1 memory controller 237a, and subchannel 2 memory controller 237b. Interleaved ECC 236 is operatively coupled to MUX/DEMUX 227, subchannel 1 memory controller 237a, and subchannel 2 memory controller 237b to produce, check, and communicate error control information for transactions directed to controller 231 that use interleaved error control schemes. Interleaved error control schemes use data and error control information that stored/retrieved across both subchannel 1 memory controller 237a, and subchannel 2 memory controller 237b (e.g., using both subchannels of memory devices 232 when memory devices 232 conforms to the DDR5 DIMM specifications.)

Scheduler 241 of control circuitry 240 coordinates the operations of subchannel 1 memory controller 237a and subchannel 2 memory controller 237b. Scheduler 241 of control circuitry 240 coordinates the operations of subchannel 1 memory controller 237a and subchannel 2 memory controller 237b to schedule the memory operations to/from memory devices 232. Scheduler 241 of control circuitry 240 also coordinates the operations of subchannel 1 ECC 235a, subchannel 2 ECC 235b, and interleaved ECC 236. Scheduler 241 of control circuitry 240 coordinates the operations of subchannel 1 ECC 235a, subchannel 2 ECC 235b, and interleaved ECC 236 subchannel 1 memory controller 237a, subchannel 2 memory controller 237b, subchannel 1 ECC 235a, subchannel 2 ECC 235b, and/or interleaved ECC 236 to schedule and issue memory operations to memory devices 232 that have different error control schemes.

Scheduler 241 of control circuitry 240 coordinates the operations of subchannel 1 ECC 235a, subchannel 2 ECC 235b, and/or interleaved ECC 236, to schedule and issue memory operations to memory devices 232 that have different transaction sizes. For example, non-interleaved error control schemes may use transactions that are a first size (e.g., 64 bytes) and use only one of subchannel 1 memory controller 237*a*, subchannel 2 memory controller 237*b*. In contrast, interleaved error control schemes may use transactions that are a second size (e.g., 128 bytes) and use both subchannel 1 memory controller 237*a* and subchannel 2 memory controller 237*b*.

FIGS. 3A-3B are illustrations of address field assignments. FIG. 3A illustrates an example fabric physical address field assignment that may be used by, for example, system 100, system 200, and/or their components. In FIG. 3A, FPA 301 includes 55 bits. Bits 5-0 of FPA 301 specify which byte in a 64 byte transaction is addressed. Bits 6-51 of FPA 301 provide a transaction layer address (e.g., CXL.mem address.) Bits 54-52 of FPA 301 specify which host port is being addressed.

FIG. 3B illustrates an example device physical address. FIG. 3B illustrates an example device physical address compatible with a system having four (4) DDR5 DIMM channels with 2 subchannels per DIMM, where the DIMMs are 32 Gb ×4 DDR5 DIMM, 16 H stack, 2R LRDIMM, 2DPC. FIG. 3B illustrates an example fabric physical address field assignment that may be used by, for example, system 100, system 200, and/or their components. In FIG. 3B, DPA 302 includes 44 bits. Bits 1-0 specify which byte in a subchannel is being addressed. Bits 5-2 of DPA 302 specify which four (4) bytes in a 64 byte transaction is addressed. Bits 12-6 specify a column address. Bits 17-13 specify bank address and bank group address. Bits 34-18 specify a row address. Bits 40-35 specify the slot, rank, and chip identification (CID). Bit 41 specifies the subchannel being addressed. Bits 43-42 specify the DIMM channel being addressed.

Figure 4A:
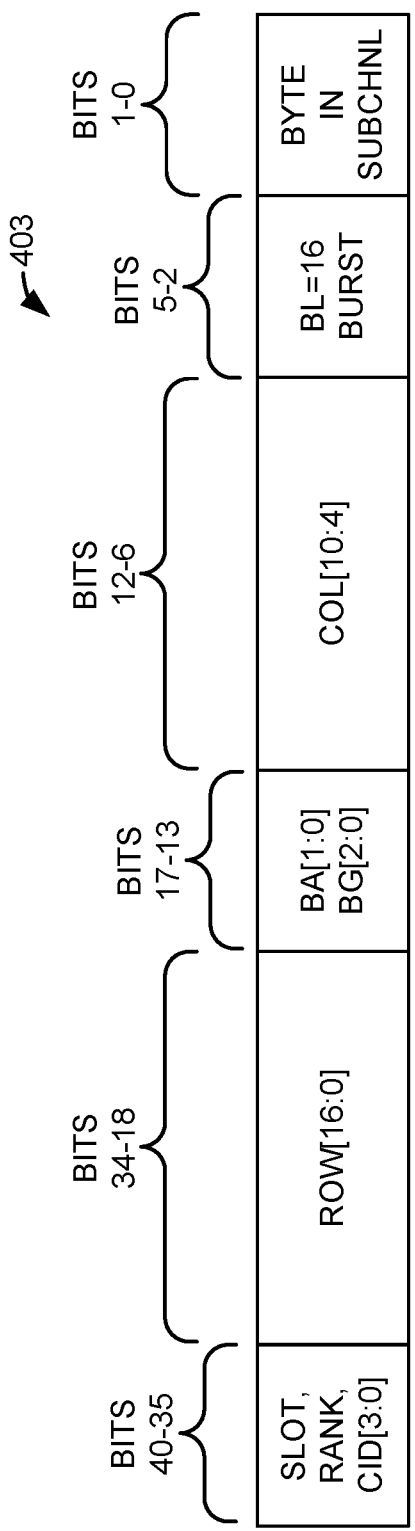
FIGS. 4A-4B are illustrations of example physical memory channel address field assignments.
Figure 4B:
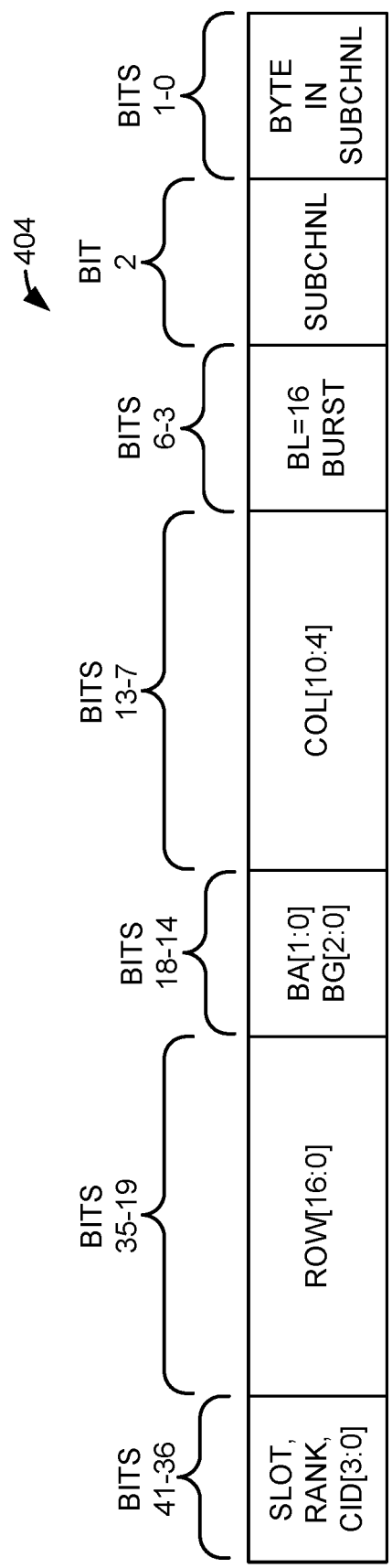

FIGS. 4A-4B are illustrations of example physical memory channel address field assignments. The address field assignments illustrated in FIGS. 4A-4B may be used on, for example, memory channels 133*a*-133*c* or by subchannel memory controllers 237*a*-237*b* and memory devices 232. FIG. 4A illustrates an example subchannel physical address compatible with 64 byte transactions. Error control schemes that are compatible with 64 byte transactions include (39,32) Hamming and interleaved subchannel error control schemes. In FIG. 4A, address 403 includes 41 bits. Bits 1-0 specify which byte in a subchannel is being addressed. Bits 5-2 of DPA 302 specify which four (4) bytes in a 64 byte transaction is addressed. Bits 12-6 specify a column address. Bits 17-13 specify bank address and bank group address. Bits 34-18 specify a row address. Bits 40-35 specify the slot, rank, and chip identification (CID).

FIG. 4B illustrates an example subchannel physical address compatible with 128 byte transactions. Error control schemes that are compatible with 128 byte transactions include (72,64) Hamming and (20,16) BCH-like codes over GF (16). In FIG. 4B, address 404 includes 42 bits. Bits 1-0 specify which byte in a subchannel is being addressed. Bit 2 specifies which subchannel is being addressed. Bits 6-3 of DPA 403 specify which four (4) bytes in a 64 byte transaction is addressed. Bits 13-7 specify a column address. Bits 18-14 specify bank address and bank group address. Bits 35-19 specify a row address. Bits 41-36 specify the slot, rank, and chip identification (CID).

Figure 5A:
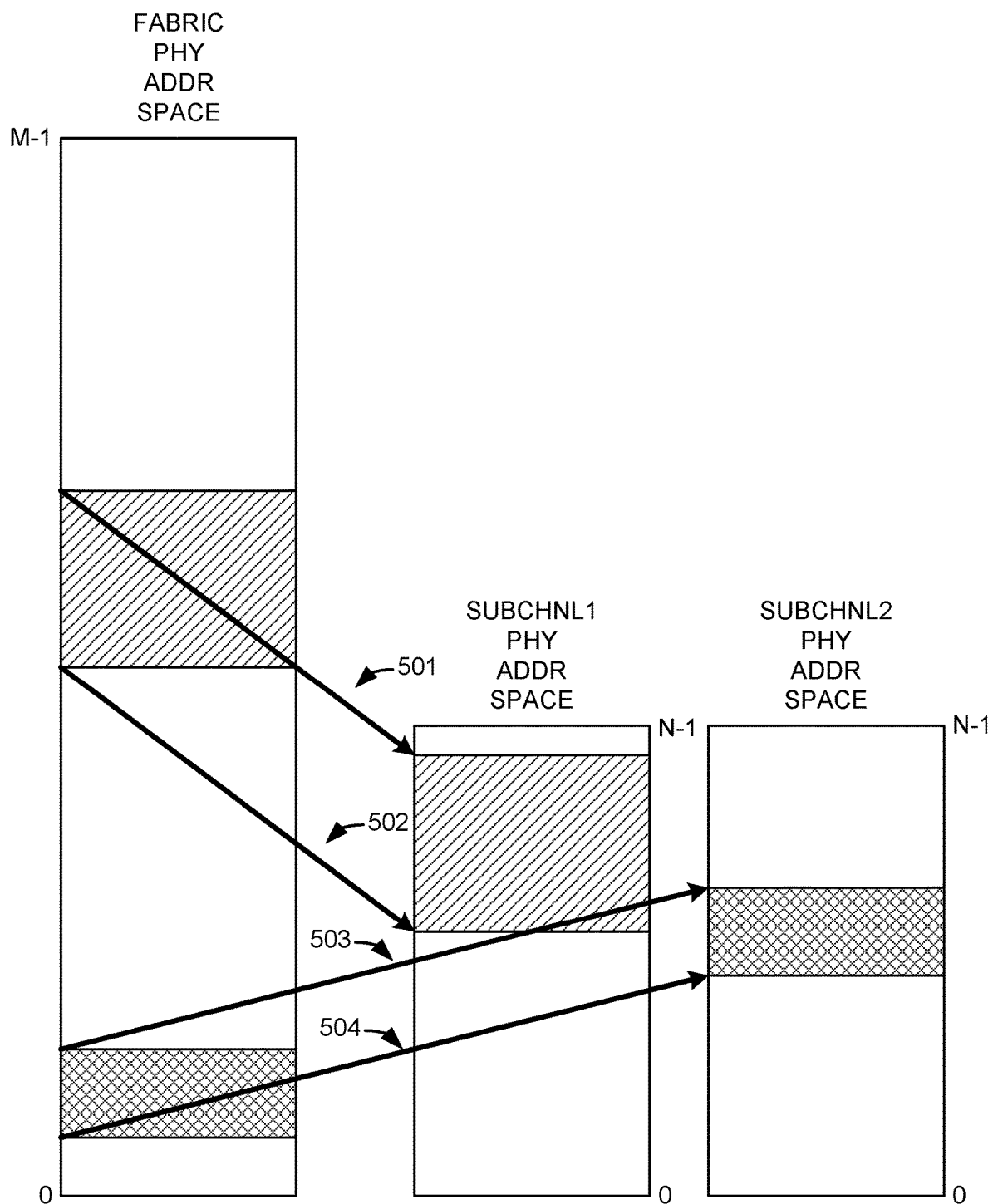
FIGS. 5A-5B are illustrations of fabric physical address to physical memory channel address mappings.
Figure 5B:
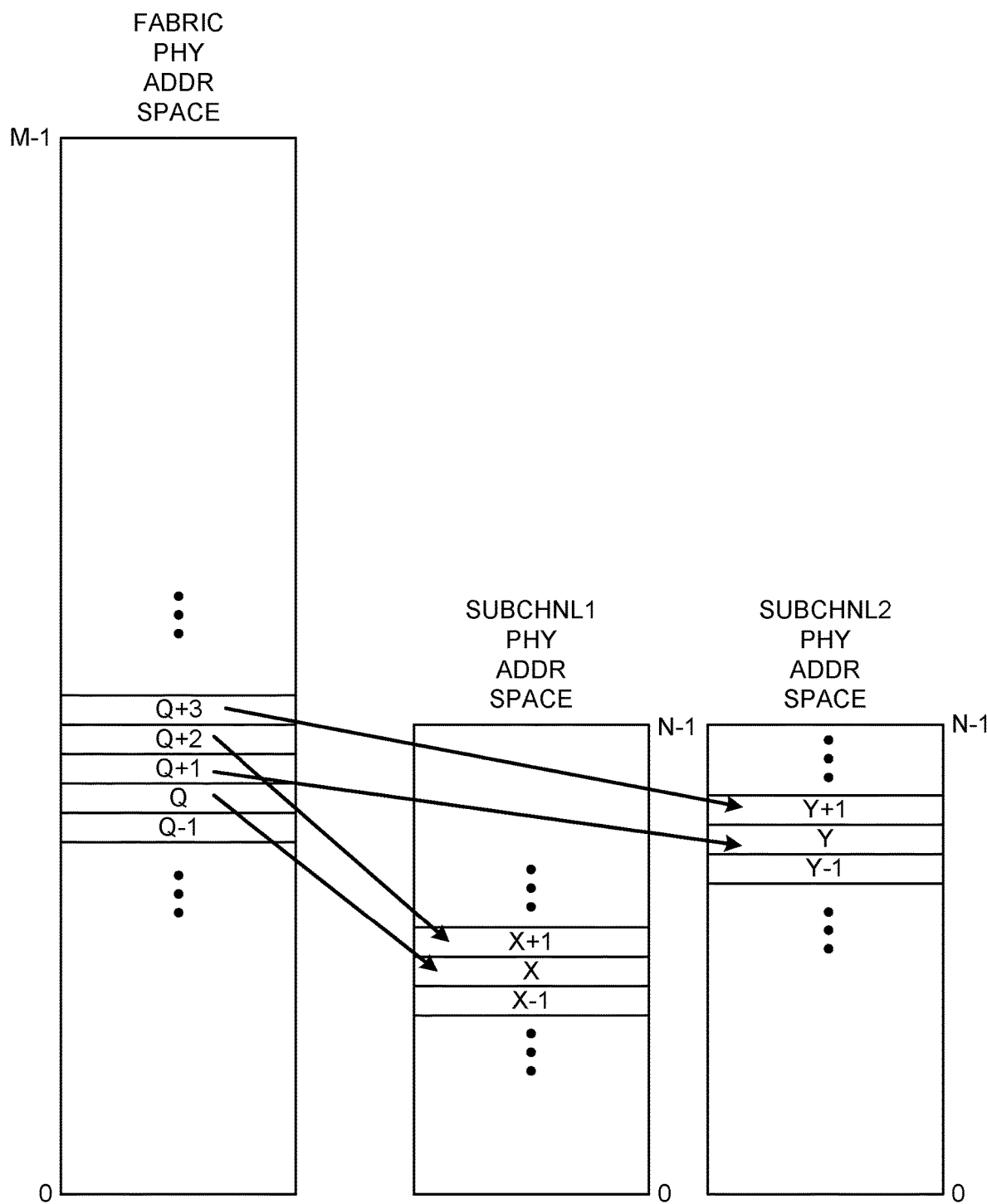

FIGS. 5A-5B are illustrations of fabric physical address to physical memory channel address mappings. FIGS. 5A-5B illustrate example fabric physical address to physical memory channel address mappings that may be used by, for example, system 100, system 200, and/or their components.

In FIG. 5A, a first fabric physical address range is mapped to a channel physical address range on subchannel 1. This is illustrated in FIG. 5A by arrows 501-502 from a first range of fabric physical addresses to a first range of addresses on subchannel 1. Also, in FIG. 5A, a second fabric physical address range is mapped to a channel physical address range on subchannel 2. This is illustrated in FIG. 5A by arrows 503-504 from a second range of fabric physical addresses to a second range of addresses on subchannel 2. It should be understood that the error control schemes used to access the first range of addresses on subchannel 1 and second range of fabric physical addresses may be the same, or may be different, as describe herein. In an embodiment, the mapping illustrated in FIG. 5A may be used to access, for example, data associated with non-interleaved (e.g., 64 byte transaction) error control schemes.

In FIG. 5B, a fabric physical address range is interleaved between subchannel 1 and subchannel 2. This is illustrated in FIG. 5B by the arrows running from addresses Q and Q+2 in the fabric physical address space to locations X and X+1, respectively in the subchannel 1 address space, and by the arrows running from addresses Q+1 and Q+3 in the fabric physical address space to locations Y and Y+1, respectively in the subchannel 1 address space. In an embodiment, Y=X. In another embodiment Y≠X. In an embodiment, the mapping illustrated in FIG. 5B may be used to access, for example, data associated with interleaved (e.g., 128 byte transaction) error control schemes.

Figure 6:
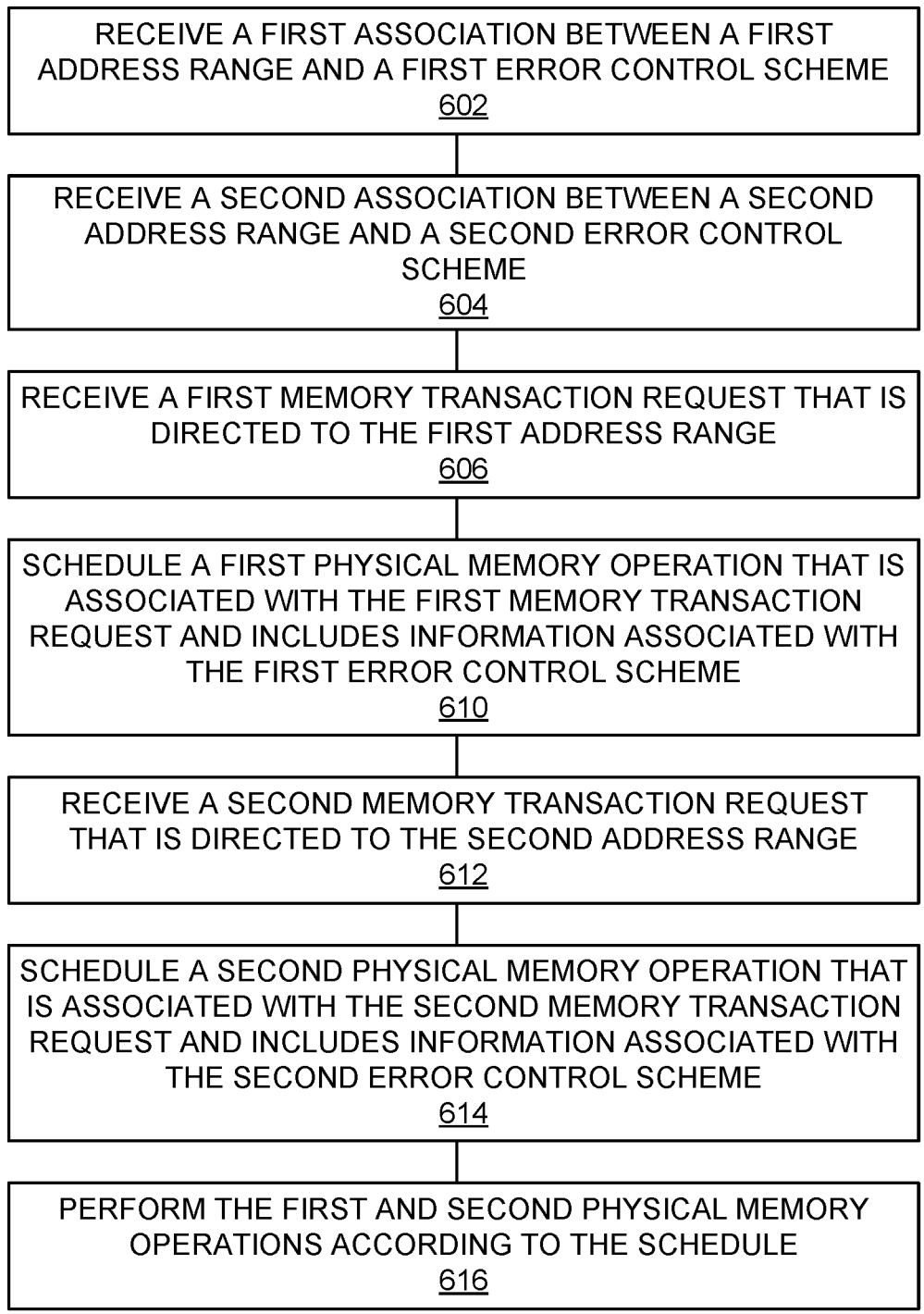
FIG. 6 is a flowchart illustrating a method of performing memory operations using a plurality of memory error control schemes.

FIG. 6 is a flowchart illustrating a method of performing memory operations using a plurality of memory error control schemes. One or more steps illustrated in FIG. 6 may be performed by, for example, system 100, system 200, and/or their components. A first association between a first address range and a first error control scheme is received (602). For example, compute node 210*a* may configure (e.g., write) one or more entries in error control scheme map 242 to specify a first address range is to use a first error control scheme.

A second association between a second address range and a second error control scheme is received (604). For example, compute node 210*b* may configure (e.g., write) one or more entries in error control scheme map 242 to specify a second address range is to use a second error control scheme. In an embodiment, the first address range and the second address range are non-overlapping if the first error control scheme and the second error control scheme are different error control schemes.

A first memory transaction request is received that is directed to the first address range (606). For example, controller 231 may receive, from compute node 210*c*, a first memory transaction request (e.g., read or write) that is directed to a first address that is within the first address range. A first physical memory operation is scheduled that is associated with the first memory transaction request and includes information associated with the first error control scheme (610). For example, scheduler 241 may schedule a first memory operation (e.g., read or write) to be performed by subchannel 2 memory controller 237*b* that communicates (reads or writes) a 64 byte block of data with memory devices 232. This 64 byte block of data is to include error control information generated using the first error control scheme. For example, the 64 byte block of data to be read from, or written to, memory devices 232 via subchannel 2 memory controller 237*b* may include payload data and (39,32) Hamming code information.

A second memory transaction request is received that is directed to the second address range (612). For example, controller 231 may receive, from compute node 210*c*, a second memory transaction request (e.g., read or write) that is directed to a second address that is within the second address range. A second physical memory operation is scheduled that is associated with the second memory transaction request and includes information associated with the second error control scheme (614). For example, scheduler 241 may schedule a second memory operation (e.g., read or write) to be performed by subchannel 1 memory controller 237*a* that communicates (reads or writes) a 64 byte block of data with memory devices 232. This 64 byte block of data is to include error control information generated using the second error control scheme. For example, the 64 byte block of data to be read from, or written to, memory devices 232 via subchannel 1 memory controller 237*a* may include payload data and (20,16) BCH code information.

The first and second physical memory operations are performed according to the schedule (616). For example, scheduler 241 may elect to perform the first memory operation and the second memory operation concurrently. Thus, for example, scheduler 241 issues the first memory operation at the same time as the second memory operation. In another example, scheduler 241 issues the second memory operation while the first memory operation is being performed.

Figure 7:
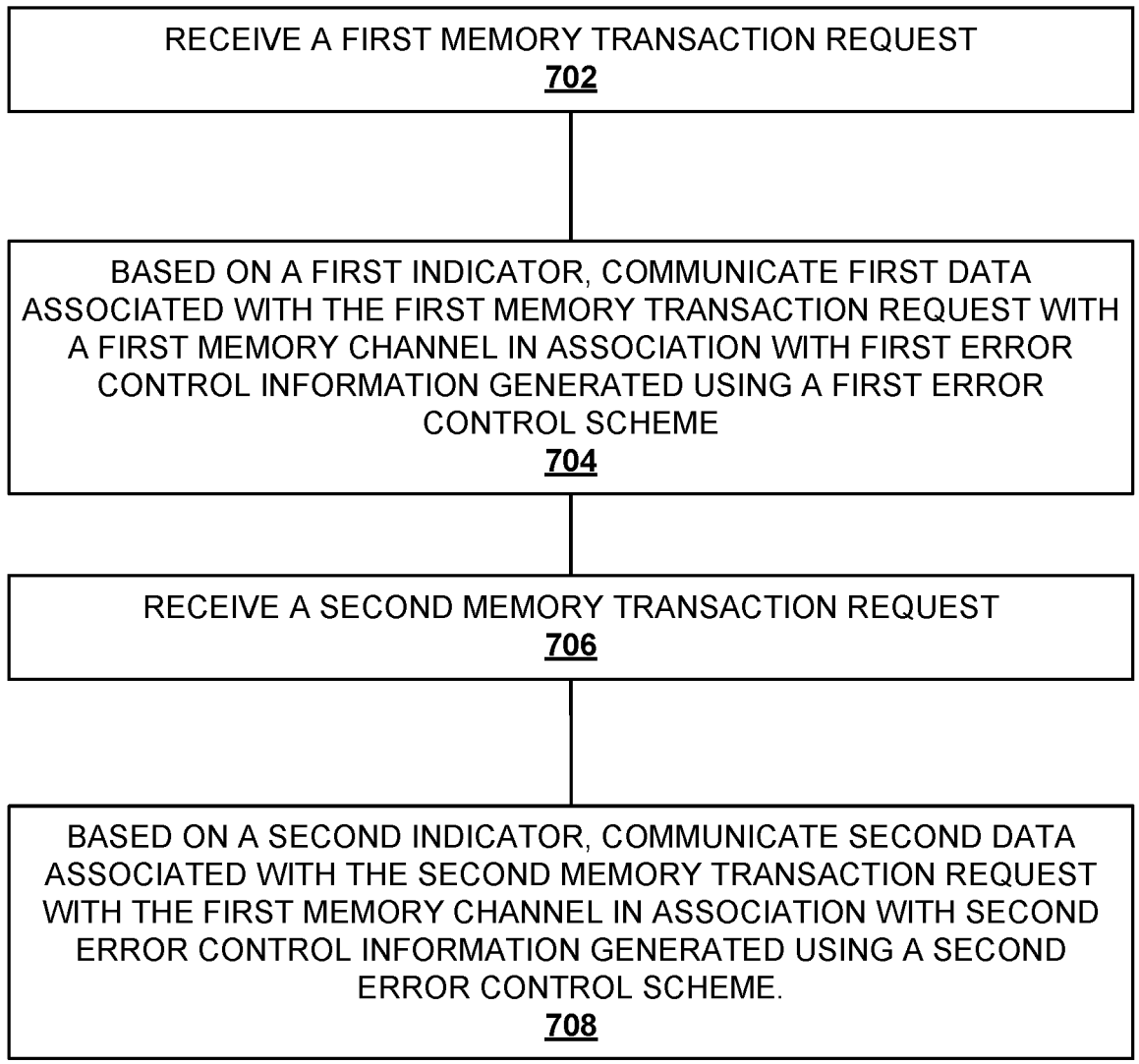
FIG. 7 is a flowchart illustrating a method of operating a memory controller.

FIG. 7 is a flowchart illustrating a method of operating a memory controller. One or more steps illustrated in FIG. 7 may be performed by, for example, system 100, system 200, and/or their components. A first memory transaction request is received (702). For example, controller 231 may receive, via interface 225*a*, a memory transaction (e.g., read or write) request from compute node 210*a*.

Based on a first indicator, first data associated with the first memory transaction request is communicated in association with first error control information generated using a first error control scheme (704). For example, based on an indicator of an error control scheme to be used when performing the first memory transaction request, subchannel 1 memory controller 237*a*, subchannel 2 memory controller 237*b*, or both may communicate data (e.g., read or write) with memory devices 232 in association with error control information generated in accordance with the indicator of the error control scheme. The indicator of the error control scheme may be based on, for example, one or more of: (1) the interface 225*a* receiving the first memory transaction request; (2) an indicator and/or other information (e.g., core ID or VM ID) included in the first memory transaction request; (3) the fabric physical address of the first memory transaction request and an FPA to error control scheme mapping; and/or (4) the device physical address of the first memory transaction request and a DPA to error control scheme mapping.

A second memory transaction request is received (706). For example, controller 231 may receive, via interface 225*b*, a memory transaction (e.g., read or write) request from compute node 210*b*. Based on a second indicator, second data associated with the second memory transaction request is communicated in association with second error control information generated using a second error control scheme (708). For example, based on an indicator of an error control scheme to be used when performing the second memory transaction request, subchannel 1 memory controller 237*a*, subchannel 2 memory controller 237*b*, or both, may communicate data (e.g., read or write) with memory devices 232 in association with error control information generated in accordance with the indicator of the error control scheme. The indicator of the error control scheme may be based on, for example, one or more of: (1) the interface 225*a* receiving the second memory transaction request; (2) an indicator and/or other information (e.g., core ID or VM ID) included in the second memory transaction request; (3) the fabric physical address of the second memory transaction request and an FPA to error control scheme mapping; and/or (4) the device physical address of the second memory transaction request and a DPA to error control scheme mapping.

Figure 8:
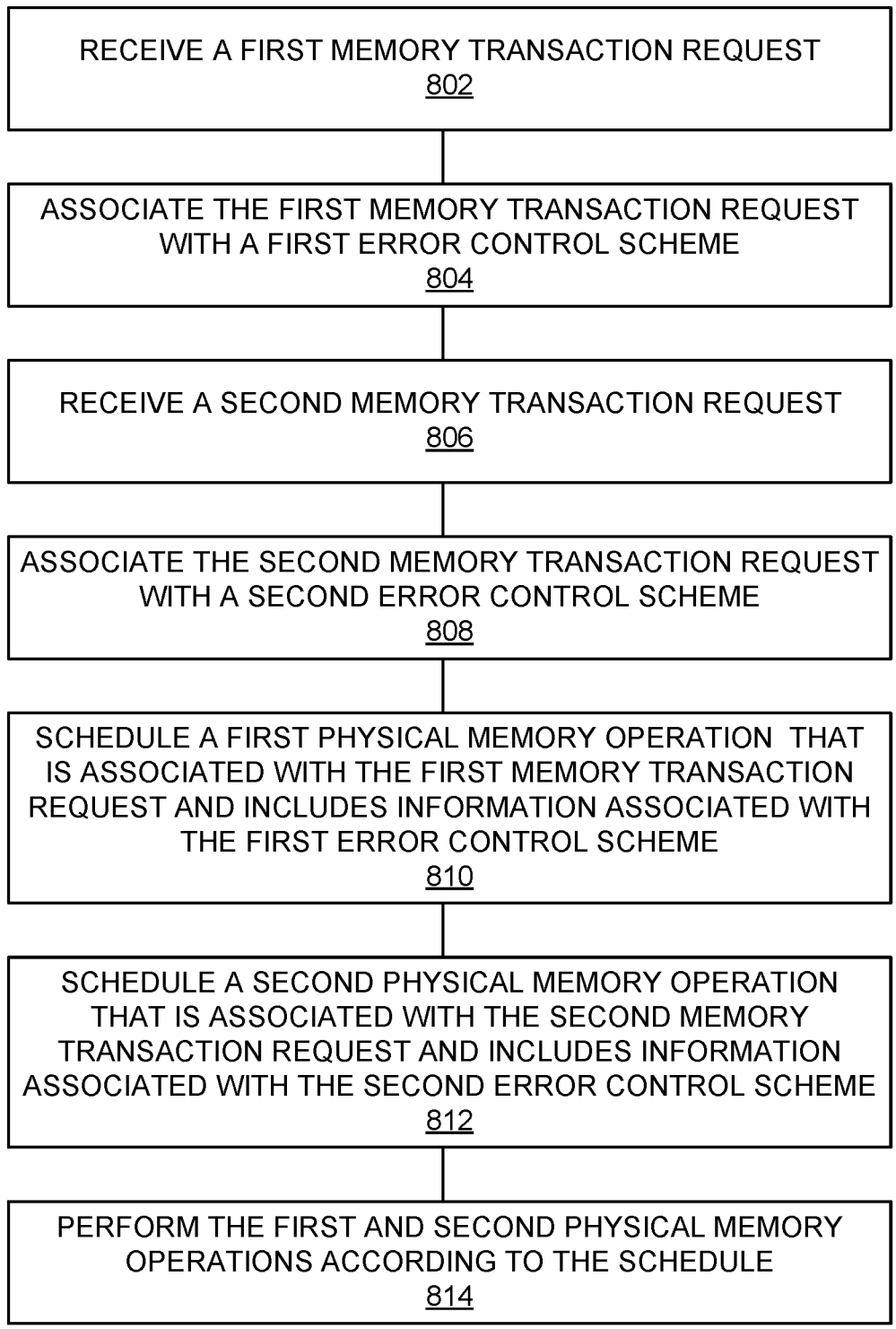
FIG. 8 is a flowchart illustrating a method of scheduling memory operations.

FIG. 8 is a flowchart illustrating a method of scheduling memory operations. One or more steps illustrated in FIG. 8 may be performed by, for example, system 100, system 200, and/or their components. A first memory transaction request is received (802). For example, controller 231 may receive, via interface 225*a*, a memory transaction (e.g., read or write) request from compute node 210*a*.

The first memory transaction request is associated with a first error control scheme (804). For example, control circuitry 240 may associate the first memory transaction request with one of the error control schemes detailed in Table 1. Control circuitry 240 may associate the first memory transaction request with an error control schemes based on, for example, one or more of: (1) the interface 225*a* receiving the first memory transaction request; (2) an indicator and/or other information (e.g., core ID or VM ID) included in the first memory transaction request; (3) the fabric physical address of the first memory transaction request and an FPA to error control scheme map 242; and/or (4) the device physical address of the first memory transaction request and a DPA to error control scheme map 242.

A second memory transaction request is received (806). For example, controller 231 may receive, via interface 225*b*, a memory transaction (e.g., read or write) request from compute node 210*b*. The second memory transaction request is associated with a second error control scheme (808). For example, control circuitry 240 may associate the second memory transaction request with one of the error control schemes detailed in Table 1. Control circuitry 240 may associate the second memory transaction request with an error control schemes based on, for example, one or more of: (1) the interface 225*b* receiving the second memory transaction request; (2) an indicator and/or other information (e.g., core ID or VM ID) included in the second memory transaction request; (3) the fabric physical address of the second memory transaction request and an FPA to error control scheme map 242; and/or (4) the device physical address of the second memory transaction request and a DPA to error control scheme map 242.

A first physical memory operation is scheduled that is associated with the first memory transaction request and includes information associated with the first error control scheme (810). For example, scheduler 241 may schedule a first memory operation (e.g., read or write) to be performed by subchannel 1 memory controller 237*a* that communicates (reads or writes) a 64 byte block of data with memory devices 232. This 64 byte block of data is to include error control information generated using the first error control scheme. For example, the 64 byte block of data to be read from, or written to, memory devices 232 via subchannel 1 memory controller 237*a* may include payload data and (39,32) Hamming code information.

A second physical memory operation is scheduled that is associated with the second memory transaction request and includes information associated with the second error control scheme (812). For example, scheduler 241 may schedule a second memory operation (e.g., read or write) to be performed by subchannel 1 memory controller 237*a* and subchannel 2 memory controller 237*b* that communicates (reads or writes) a 128 byte block of data with memory devices 232. This 128 byte block of data is to include error control information generated using the second error control scheme. For example, the 128 byte block of data to be read from, or written to, memory devices 232 via subchannel 1 memory controller 237a and subchannel 2 memory controller 237b may include payload data and (20,16) BCH code information.

The first and second physical memory operations are performed according to the schedule (814). For example, scheduler 241 may elect to perform the second memory operation first, and the first memory operation second. Thus, because the second memory operation uses both subchannel 1 memory controller 237a and subchannel 2 memory controller 237b, scheduler 241 issues the second memory operation first and the first memory operation second.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 200, and/or their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
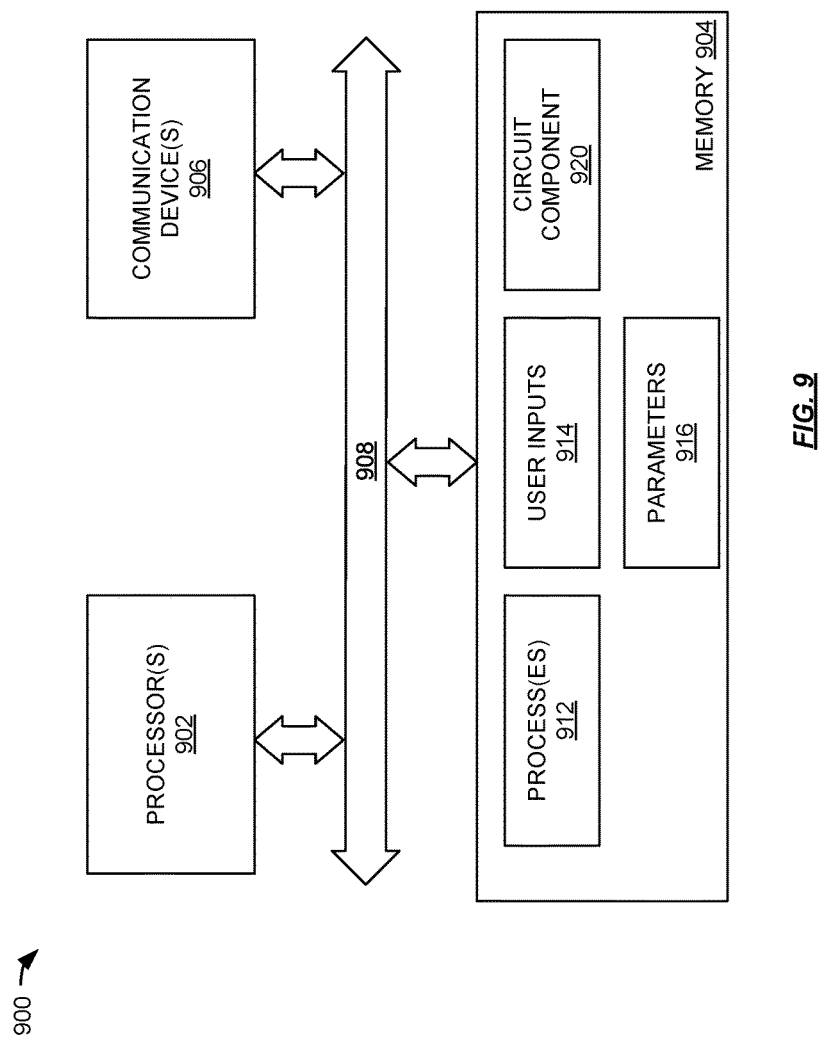
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of system 100, system 200, and/or their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: A memory buffer device, comprising: a first host interface to receive memory transaction requests; and, memory device interface to, based on a first indicator, communicate first data having a first memory error resiliency policy with a first memory device, and to, based on a second indicator, communicate first data having a second memory error resiliency policy with the first memory device.

Example 2: The memory buffer device of example 1, further comprising: a second host interface to receive memory transaction requests, the first indicator associated with memory transaction requests received via the first host interface, the second indicator associated with memory transaction requests received via the second host interface.

Example 3: The memory buffer device of example 1, further comprising: a storage element to associate the first indicator with a first address range, and to associate the second indicator with a second address range.

Example 4: The memory buffer device of example 1, wherein the first indicator is received via a first memory transaction request and the second indicator is received via a second memory transaction request.

Example 5: The memory buffer device of example 4, wherein a first source identification indicator in the first memory transaction request is associated with the first indicator, and a second source identification indicator in the second memory transaction request is associated with the second indicator.

Example 6: The memory buffer device of example 1, further comprising: a storage element to associate a first fabric physical address range with the first indicator and to associate a second fabric physical address range with the second indicator.

Example 7: The memory buffer device of example 1, further comprising: a storage element to associate a first memory physical address range with the first indicator and to associate a second memory physical address range with the second indicator.

Example 8: A memory node device, comprising: a first interface to receive memory commands; first circuitry to, based on a first indicator, communicate first data with a first memory channel in association with first error control information generated using a first error control scheme; and, second circuitry to, based on a second indicator, communicate second data with the first memory channel in association with second error control information generated using a second error control scheme.

Example 9: The memory node device of example 8, wherein, based on the second indicator, the second circuitry is to communicate third data with a second memory channel in association with third error control information generated using the second error control scheme.

Example 10: The memory node device of example 8, further comprising: a second interface to receive memory commands, the first indicator to be based on whether a first memory command was received via the first interface, the second indicator to be based on whether a second memory command was received via the second interface.

Example 11: The memory node device of example 8, wherein the first indicator is based on information received via a first memory command and the second indicator is based on information received via a second memory command.

Example 12: The memory node device of example 11, wherein the first indicator is associated with a first source identification indicator and the second indicator is associated with a second source identification indicator.

Example 13: The memory node device of example 8, further comprising: a storage element to associate a first fabric physical address range with the first indicator and to associate a second fabric physical address range with the second indicator.

Example 14: The memory node device of example 8, further comprising: a storage element to associate a first memory physical address range with the first indicator and to associate a second memory physical address range with the second indicator.

Example 15: A method, comprising: receiving a first memory transaction request; based on a first indicator, communicating first data associated with the first memory transaction request with a first memory channel in association with first error control information generated using a first error control scheme; receiving a second memory transaction request; and, based on a second indicator, communicating second data associated with the second memory transaction request with the first memory channel in association with second error control information generated using a second error control scheme.

Example 16: The method of example 15, wherein the first memory transaction request is received via a first host interface that is associated with the first indicator, and the second memory transaction request is received via a second host interface that is associated with the second indicator.

Example 17: The method of example 15, wherein the first memory transaction request includes first information to associate the first memory transaction request with the first error control scheme and the second memory transaction request includes second information to associate the second memory transaction request with the second error control scheme.

Example 18: The method of example 17, wherein the first information comprises a first source identifier and the second information comprises a second source identifier.

Example 19: The method of example 15, further comprising: receiving an association between a first fabric physical address and the first indicator; and, receiving an association between a second fabric physical address and the second indicator.

Example 20: The method of example 15, further comprising: receiving an association between a first memory physical address and the first indicator; and, receiving an association between a second memory physical address and the second indicator.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory buffer device, comprising:
   a first host interface to receive a first memory transaction request that includes a first virtual machine identification indicator and to receive a second memory transaction request that includes a second virtual machine identification indicator;
   circuitry to, based on the first virtual machine identification indicator, associate the first memory transaction request with a first memory error resiliency policy and to, based on the second virtual machine identification indicator, associate the second memory transaction request with a second memory error resiliency policy;
   circuitry to, based on the first memory transaction request and the first memory error resiliency policy, produce first data having the first memory error resiliency policy, and to, based on the second memory transaction request and the second memory error resiliency policy, produce second data having the second memory error resiliency policy; and
   a memory device interface to communicate the first data having the first memory error resiliency policy with a first memory device, and to communicate the second data having the second memory error resiliency policy with the first memory device.

2. The memory buffer device of claim 1, further comprising:
   a second host interface to receive memory transaction requests, the association of the first memory error resiliency policy to the first memory transaction request to be further based on the first host interface receiving the first memory transaction request.

3. The memory buffer device of claim 1, further comprising:
   a storage element to associate the first memory error resiliency policy with a first address range, and to associate the second memory error resiliency policy with a second address range.

4. The memory buffer device of claim 1, wherein a first indicator associated with the first memory error resiliency policy is received via the first memory transaction request and a second indicator associated with the second memory error resiliency policy is received via the second memory transaction request.

5. The memory buffer device of claim 4, wherein a first source identification indicator in the first memory transaction request is associated with the first indicator, and a second source identification indicator in the second memory transaction request is associated with the second indicator.

6. The memory buffer device of claim 1, further comprising:
a storage element to associate a first fabric physical address range with the first memory error resiliency policy and to associate a second fabric physical address range with the second memory error resiliency policy.

7. The memory buffer device of claim 1, further comprising:
a storage element to associate a first memory physical address range with the first memory error resiliency policy and to associate a second memory physical address range with the second memory error resiliency policy.

8. A memory node device, comprising:
a first interface to receive memory commands;
first circuitry to, based on a first indicator of a first error control scheme that is based on a first virtual machine indicator, communicate first data with a first memory channel in association with first error control information generated using the first error control scheme; and,
second circuitry to, based on a second indicator of a second error control scheme that is based on a second virtual machine indicator, communicate second data with the first memory channel in association with second error control information generated using the second error control scheme.

9. The memory node device of claim 8, wherein, based on the second indicator, the second circuitry is to communicate third data with a second memory channel in association with third error control information generated using the second error control scheme.

10. The memory node device of claim 8, further comprising:
a second interface to receive memory commands, the first indicator to be further based on whether a first memory command was received via the first interface, the second indicator to be further based on whether a second memory command was received via the second interface.

11. The memory node device of claim 8, wherein the first indicator is further based on information received via a first memory command and the second indicator is further based on information received via a second memory command.

12. The memory node device of claim 11, wherein the first indicator is associated with a first source identification indicator and the second indicator is associated with a second source identification indicator.

13. The memory node device of claim 8, further comprising:
a storage element to associate a first fabric physical address range with the first indicator and to associate a second fabric physical address range with the second indicator.

14. The memory node device of claim 8, further comprising:
a storage element to associate a first memory physical address range with the first indicator and to associate a second memory physical address range with the second indicator.

15. A method, comprising:
receiving a first memory transaction request;
based on a first indicator of a first error control scheme that is based on a first virtual machine indicator, communicating first data associated with the first memory transaction request with a first memory channel in association with first error control information generated using a first error control scheme;
receiving a second memory transaction request; and,
based on a second indicator of a second error control scheme that is based on a second virtual machine indicator, communicating second data associated with the second memory transaction request with the first memory channel in association with second error control information generated using a second error control scheme.

16. The method of claim 15, wherein the first memory transaction request is received via a first host interface that is associated with the first indicator, and the second memory transaction request is received via a second host interface that is associated with the second indicator.

17. The method of claim 15, wherein the first memory transaction request includes first information to associate the first memory transaction request with the first error control scheme and the second memory transaction request includes second information to associate the second memory transaction request with the second error control scheme.

18. The method of claim 17, wherein the first information comprises a first source identifier and the second information comprises a second source identifier.

19. The method of claim 15, further comprising:
receiving an association between a first fabric physical address and the first indicator; and,
receiving an association between a second fabric physical address and the second indicator.

20. The method of claim 15, further comprising:
receiving an association between a first memory physical address and the first indicator; and,
receiving an association between a second memory physical address and the second indicator.

* * * * *